United States Patent [19]

Mitsuya et al.

[11] Patent Number: 4,992,923
[45] Date of Patent: Feb. 12, 1991

[54] ELECTRICAL POWER SUPPLY, FUSING APPARATUS AND RECORDING APPARATUS USING THE SAME

[75] Inventors: Teruaki Mitsuya; Yasuro Hori, both of Katsuta; Takao Kumasaka, Takahagi; Shinichi Nishino, Katsuta; Shigetaka Fugiwara, Hitachi, all of Japan

[73] Assignees: Hitachi, Ltd.; Hitachi Koki Co., Ltd., both of Tokyo, Japan

[21] Appl. No.: 393,956

[22] Filed: Aug. 15, 1989

[30] Foreign Application Priority Data

Aug. 19, 1988 [JP] Japan .................. 63-204703

[51] Int. Cl.⁵ .................. G03G 15/20; H02M 7/19
[52] U.S. Cl. .................. 363/61; 307/110; 355/288; 315/241 P
[58] Field of Search .................. 363/59, 60, 61, 126, 363/127, 128; 307/109, 110; 320/1; 355/285, 286, 288, 228–229; 315/182, 241 P

[56] References Cited

U.S. PATENT DOCUMENTS

| | | | |
|---|---|---|---|
| 3,290,580 | 12/1966 | Wolff | 363/61 |
| 3,824,447 | 7/1974 | Kuwabara | 363/60 |
| 3,900,786 | 8/1975 | Jordan | 363/128 |
| 4,016,476 | 4/1977 | Morokawa et al. | 363/60 |
| 4,068,295 | 1/1978 | Portmann | 363/60 |
| 4,460,952 | 7/1984 | Risinger | 363/61 |

FOREIGN PATENT DOCUMENTS

| | | |
|---|---|---|
| 0098187 | 6/1973 | Fed. Rep. of Germany . |
| 54-126546 | 1/1979 | Japan . |
| 57-52380 | 3/1982 | Japan . |
| 59-121365 | 7/1984 | Japan . |
| 61-20075 | 1/1986 | Japan . |
| 0526040 | 1/1977 | U.S.S.R. .................. 363/60 |

OTHER PUBLICATIONS

L. M. Ernst et al., "Flash Fuser Power Supplies", IBM Technical Disclosure Bulletin, vol. 23, No. 2, Jul. 1980, pp. 513–515.

"High Voltage Engineering", Institute of Electrical Engineers of Japan, pp. 90–91.

Primary Examiner—Peter S. Wong
Attorney, Agent, or Firm—Antonelli, Terry, Stout & Kraus

[57] ABSTRACT

Disclosed is an electrical power supply for use, for example, for a flash fusing device in an electrophotographic recording apparatus, in which a DC high voltage is generated from a low voltage of an AC power supply so that the high voltage DC energy is momentarily consumed or discharged. The electrical power supply is configured in a manner so that, in order to make unnecessary a charging capacitor and a current limiting resistor for preventing rectifier elements from being damaged, at least some of the rectifier elements are constituted by rectifying control elements such as thyristors or transistors and a control signal is given to those rectifying control elements so as to make the rectifying control elements be in an isolated state. By use of such a configuration, the electrical power supply can be reduced in size as well as in power loss. The effect can be fully exhibited not only in a fusing apparatus employing the electrical power supply but in a recording apparatus employing such a fusing apparatus.

11 Claims, 6 Drawing Sheets

ELECTRICAL POWER SUPPLY, FUSING APPARATUS AND RECORDING APPARATUS USING THE SAME

BACKGROUND OF THE INVENTION

The present invention relates to an electrical power supply for momentarily supplying a DC high voltage to a load, and a fusing apparatus and a recording apparatus which employ such an electrical power supply.

In an electrophotographic flash fusing apparatus or the like, a DC high-voltage is produced from a low-voltage AC power supply, and the produced DC high voltage is used as a power supply for flash. In the prior art of an electrical power supply having such a purpose, a low voltage has been converted into a DC high voltage by using a Cockcroft circuit (alias "Cockcroft-Walton circuit"), as described in "High Voltage Engineering" pp. 90-91 (published by the Institute of Electrical Engineers of Japan) and JP-A-57-52380.

Figure 10:
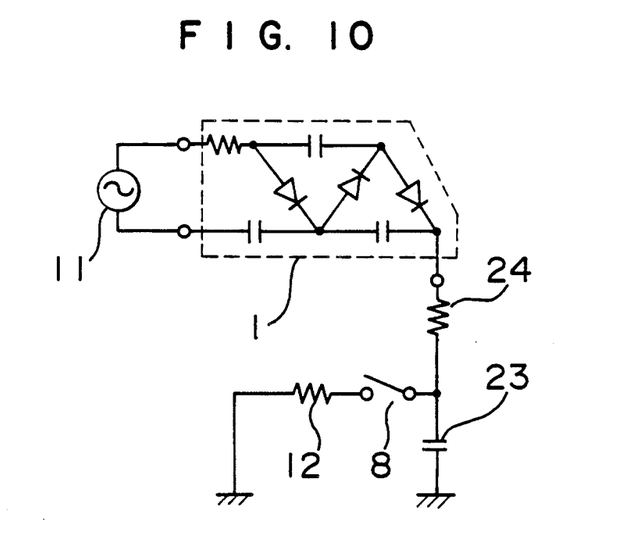
FIG. 10 is a circuit diagram illustrating a conventional electrical power supply.

FIG. 10 is a circuit diagram of a conventional electrical power supply. A Cockcroft-Walton circuit 1 is constituted by rectifier elements, capacitors and resistors so as to produce a DC high voltage from an AC low voltage of a low-voltage AC power supply 11 and so as to charge a charging/discharging capacitor 23 with the produced DC high voltage through a limiting resistor 24. During the period of charging, a switch 8 is in an opened state, and upon completion of sufficient charging, the switch 8 is closed so that the capacitor 23 is momentarily discharged through a load 12. The limiting resistor 24 serves to prevent the rectifier elements of the Cockcroft-Walton circuit 1 from being damaged in the period of discharging.

In the above-mentioned prior art, there has been a problem that the electrical power supply is large in volume as well as in weight because of the presence of a charging/discharging capacitor and a limiting resistor, and there has been a further problem that the electrical power loss in the limiting resistor is equal to the power consumption in the load. Such problems have been serious particularly in an electrophotographic flash fusing apparatus and an electrophotographic flash pre-heating apparatus which have been required to be compact in size and low in power consumption.

SUMMARY OF THE INVENTION

It is therefore an object of the present invention to solve the foregoing problems in the prior art.

It is another object of the present invention to provide an electrical power supply from which a limiting resistor and a charging/discharging capacitor are eliminated for the sake of reducing its volume, weight and power loss.

It is a further object of the present invention to provide a fusing apparatus employing the above-mentioned electrical power supply.

It is a still further object of the present invention to provide a recording apparatus employing the above-mentioned electrical power supply.

The foregoing objects are attained by the electrical power supply according to the present invention, in which thyristors or transistors are used for a part or the whole of rectifier elements of a Cockcroft-Walton circuit, and a control signal for isolating or turning off these thyristors or transistors is given at the time of discharging.

Since the control signal makes the thyristors or transistors used for rectifier elements be in an isolated state, the current of these isolated rectifier elements and other rectifier elements becomes zero or is reduced at the time of discharging, so as to prevent the rectifier elements from being damaged at the time of discharging. It is therefore possible to eliminate a limiting resistor and a charging capacitor to thereby realize minimization in size as well as in loss.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

Figure 1:
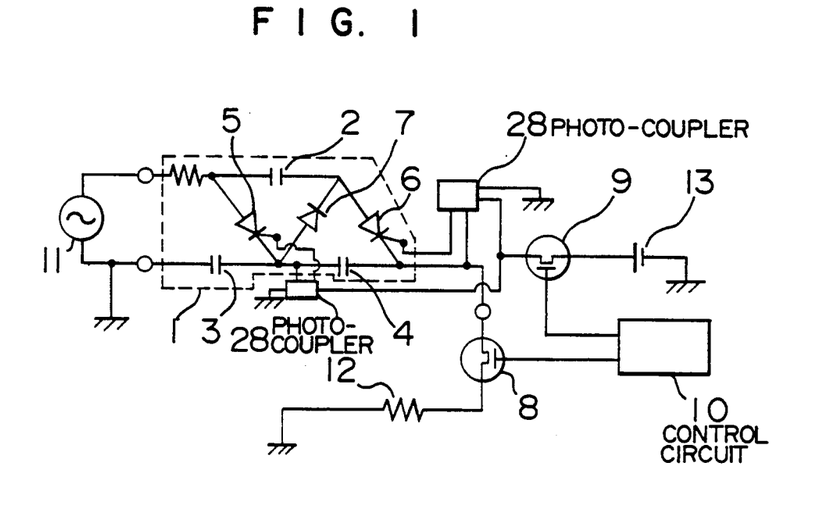
FIG. 1 is a diagram illustrating a first embodiment of the electrical power supply according to the present invention.

FIG. 1 is a circuit diagram illustrating a first embodiment of the electrical power supply according to the present invention. A Cockcroft-Walton circuit 1 is constituted by capacitors 2 to 4, thyristors 5 and 6 and a diode 7. By this circuit, a DC voltage three times as high as a peak value of an AC voltage applied from a primary side AC power supply 11 is obtained at the nearest position to a load 12, i.e. the junction between the capacitor 4 and the thyristor 6. A control circuit 10 controls the on-off operation of switches 8 and 9. A 5-volt DC power supply 13 is used as a signal for driving the thyristors 5 and 6, so that the thyristors 5 and 6 perform a rectifying function when the switch 9 is in a closed state, while the thyristors 5 and 6 are put in an isolated or open state when the switch 9 is in an opened state. Such elements as those thyristors are called "rectifying control elements". Since it is necessary that gate terminals of the thyristors 5 and 6 are used in a floating state, the gate terminals cannot be grounded directly. Therefore, photo-couplers 28 are provided between the switches 8 and 9 and the thyristors 5 and 6. The switch 8 is provided for controlling the discharge to the load 12, and the discharge is performed through the switch 8 when the switch 8 is in a closed state.

In this electrical power supply, it takes about 0.5 seconds for boosting, and during the boosting, the control circuit 10 maintains the switches 8 and 9 in opened and closed state, respectively, so as to charge the capacitors 2 to 4. Since the switch 8 is in an opened state at that time, the respective currents flowing in the thyristors 5 and 6 and the diode 7 are sufficiently smaller than their allowable maximum current values. If the switch 8 was closed in this state, the capacitors 2 to 4 would be discharged momentarily into the load 12 through the switch 8. A current i is a time differential of a discharged charge q, that is, dq/dt. If charging time is on the other of microseconds (μs) long, the current flowing in each of the thyristors 5 and 6 and the diode 7 would reach a value of 5 to 10 kA so as to exceed the allowable maximum current value of each of the thyristors 5 and 6 and the diode 7, so that those thyristors and diode might be damaged. In the conventional electrical power supply (shown in FIG. 10), therefore, the limiting resistor 24 and the charging capacitor 23 have been required. In this embodiment according to the present invention, however, the capacitors 2 to 4 are charged under the condition that the switch 8 is opened and the switch 9 is closed, and at the next timing, the switch 9 is opened by the control circuit 10 while the switch 8 is left opened. At this time, since the thyristors 5 and 6 are in an open state, a serial circuit is formed from a primary side ground, i.e. the earth terminal of the AC power supply 11 to the switch 8 through the capacitors 3 and 4 while the capacitors 3 and 4 are left charged. At the next timing, the switch 8 is closed by the control circuit 10 while the switch 9 is left opened, so that the charge accumulated in the capacitors 3 and 4 is discharged momentarily into the load 12 through the switch 8. In this condition, the switch 9 is in an opened state, the thyristors 5 and 6 are in an isolated state, so that no current can flow in the diode 7 as well as the thyristors 5 and 6, and the thyristors 5 and 6 and the diode 7 cannot be damaged by the discharge of the capacitors 3 and 4.

Although thyristors are employed as the rectifying control elements in this embodiment, the same effect can be obtained when transistors are used. Further, in the case where the diode 7 is replaced by a thyristor and all the rectifier elements are controlled in the same manner, the same effect can be obtained. Furthermore, in this circuit configuration, if the diode 7 is replaced by a thyristor and the thyristor 6 is replaced by a diode, that is, if only the final stage is constituted by a diode in the circuit configuration, and if thyristors are controlled in the same manner as described above, there is a possibility that the final stage diode may be damaged by a current flowing therethrough by discharging of the capacitor 2. The foregoing description may be summarized that the most effective way is to control rectifier elements provided in odd numbered stages in a Cockcroft-Walton circuit as mentioned in this embodiment.

Figure 2:
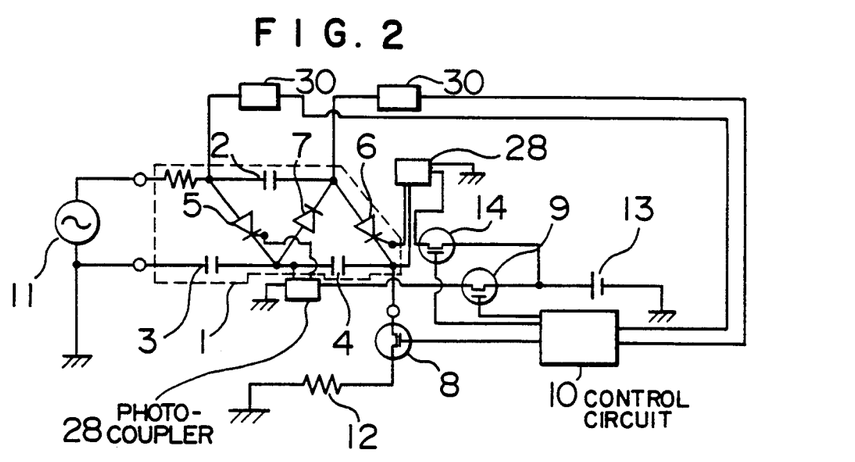
FIG. 2 is a diagram illustrating a second embodiment of the electrical power supply according to the present invention.
Figure 3:
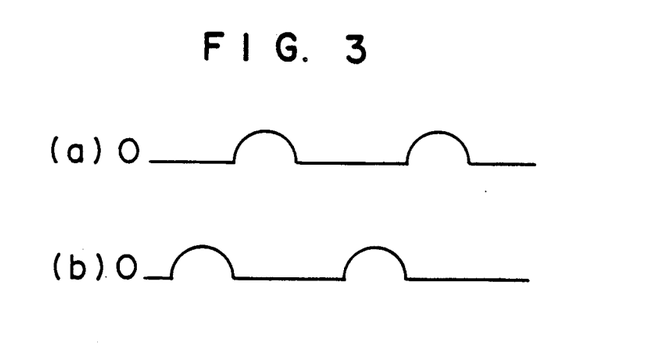
FIG. 3 is a diagram illustrating the operation waveform of a thyristor in the embodiment in FIG. 2.

FIG. 2 is a circuit diagram illustrating a second embodiment of the electrical power supply according to the present invention. In this embodiment of the present invention, a switch 14 is further provided so that the control circuit can control the thyristors 5 and 6 independently of each other. Except for this point, the embodiment of FIG. 2 is the same as that of FIG. 1. FIG. 3 shows waveforms of the currents flowing in the thyristors 5 and 6, both of which are pulsating currents as shown in the waveform diagrams (a) and (b) respectively. The charging voltage of each of the capacitors 2 to 4 is increased as the charging time passes and at last reaches a stationary state, that is, it saturates, so that the peak value of the pulsating current flowing in each thyristor becomes smaller. When the capacitors 2 to 4 have become completely saturated and the thyristors 5 and 6 are in an isolated state, the current flowing in each of the thyristors 5 and 6 is very slight, and the method of the embodiment shown in FIG. 1 suffices. However, in the case of controlling a discharge voltage, it is necessary to isolate or open one of the thyristors 5 and 6 in accordance with the charge voltage of the capacitor before the capacitor has been saturated. This is because, there is a possibility that a current still flows in one of the thyristors at this time. That is, if each capacitor is in a saturated state under the condition that the switch 8 is opened, the state of each capacitor is static so that no current flows in each capacitor. This state is called a stationary state. In a transient state before reaching this stationary state, a current flows in each capacitor, so that a current flows in each of the thyristors between the capacitors. If the thyristors are forcedly opened in this condition that currents are flowing in the thyristors, there is a possibility that the thyristors are damaged. In this embodiment, switches are controlled so that the thyristors 5 and 6 are put in an isolated state at the timing when the current flowing in one of the thyristors shown in FIG. 3 becomes zero.

This control is performed in the following procedure. The relationship of timing of the opening/closing operation of the switches 8, 9 and 14 is similar to that in the embodiment of FIG. 1. That is, the capacitors are charged under the condition that the switch 8 is opened, the switches 9 and 14 are closed, and at the timing when the current flowing in the thyristor 5 becomes zero, the switch 9 is opened. At this time, the switches 14 and 8 are left closed and opened respectively. Next, at the timing when the current flowing in the thyristor 6 becomes zero, the switch 14 is opened. At this time, both the switches 9 and 8 are in an opened state. At the next timing, the switch 8 is closed while the switches 9 and 14 are left opened, so that the capacitors are discharged to the load through the switch 8.

In order to detect the timings when the currents of the thyristors 5 and 6 become zero, respectively, current detectors 30 are provided as shown in FIG. 2 and the outputs of the detectors are connected to the control circuit 10 so as to effect the above-mentioned control operation. However, these timings may be determined based on the periodic cycles of the AC power supply 11. Of course, the circuit of FIG. 1 may be provided with a similar current detector, an output of which is connected to the control circuit 10 for controlling the on-off of the switches 8 and 9. According to this embodiment, even in the midway of charging of the capacitors, the thyristors 5 and 6 can be put into an isolated or open state without being damaged. Accordingly, there is an effect that a discharge voltage can be adjusted.

Figure 4:
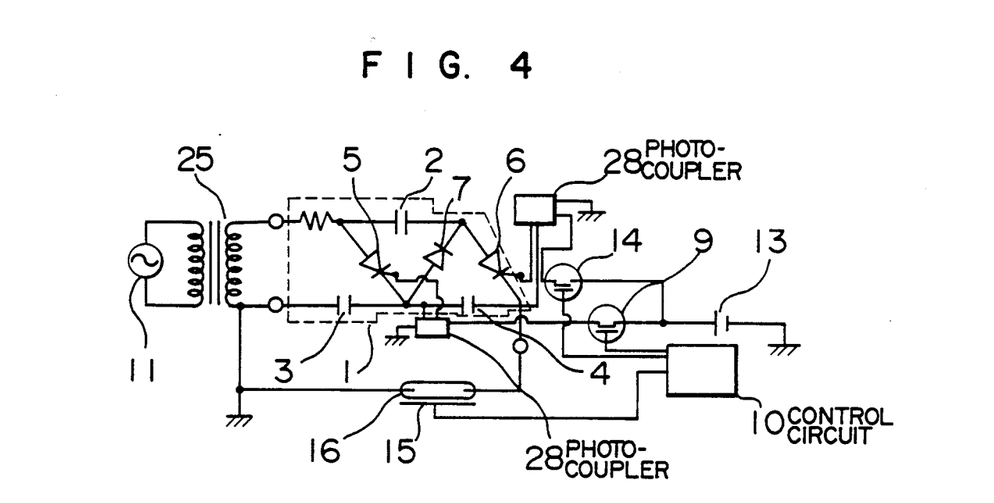
FIG. 4 is a diagram illustrating an embodiment of a flash light emitting apparatus and a flash fusing apparatus using the electrical power supply according to the present invention.

FIG. 4 shows an application of the electrical power supply to a flash light emitting apparatus. This embodiment is for making a flash lamp emit light by use of the electrical power supply shown in FIG. 2. That is, a low voltage of the primary-side AC power supply 11 is boosted by an insulating transformer 25, and further boosted and rectified by the Cockcroft-Walton circuit 1 the same as shown in FIG. 2. The control circuit 10 is connected not only to the switches 14 and 9 but to a trigger line 15 so as to apply a high frequency signal onto the trigger line 15 at the same timing as the switch 8 of FIG. 2 is closed. At this time, the capacitors 3 and 4 are discharged to a xenon flush lamp 16 so as to make the xenon flush lamp 16 emit flash light. The conventional xenon flash lamp light emitting power supply has a problem that it is large in its volume and weight because of presence of the charging capacitor 23 and the limiting resistor 24, and has a further problem that its power loss is large. According to this embodiment, on the contrary, such a limiting resistor and such a charging capacitor are eliminated and the above problems in the prior art power supply are solved.

Figure 5:
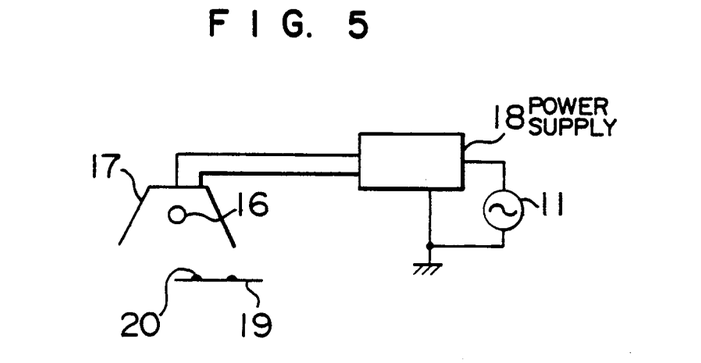
FIG. 5 is a sectional side view illustrating a flash fusing apparatus in an electrophotographic apparatus using the electrical power supply according to the present invention.

FIG. 5 is a sectional side view of a flash fusing apparatus in an electrophotographic apparatus such as a printer, a copying machine, a facsimile, etc. employing the electrical power supply according to the present invention. An electrical power supply 18 and a xenon flash lamp 16 are the quite same as those shown in FIG. 4. According to the fusing apparatus, toner 20 is deposited as a picture image onto recording paper 19 by means of transfer means, and then the recording paper 19 and the toner 20 are irradiated with the flush light of the xenon flash lamp 16 with the aid of a reflecting plate 17 so that the toner 20 is heated and fused so as to be fixed on the recording paper 19. According to this embodiment, since the electrical power supply 18 has no limiting resistor and no charging capacitor, there is an effect that it is possible to obtain a flash fusing apparatus which is small in volume, in weight and in power loss.

Figure 6:
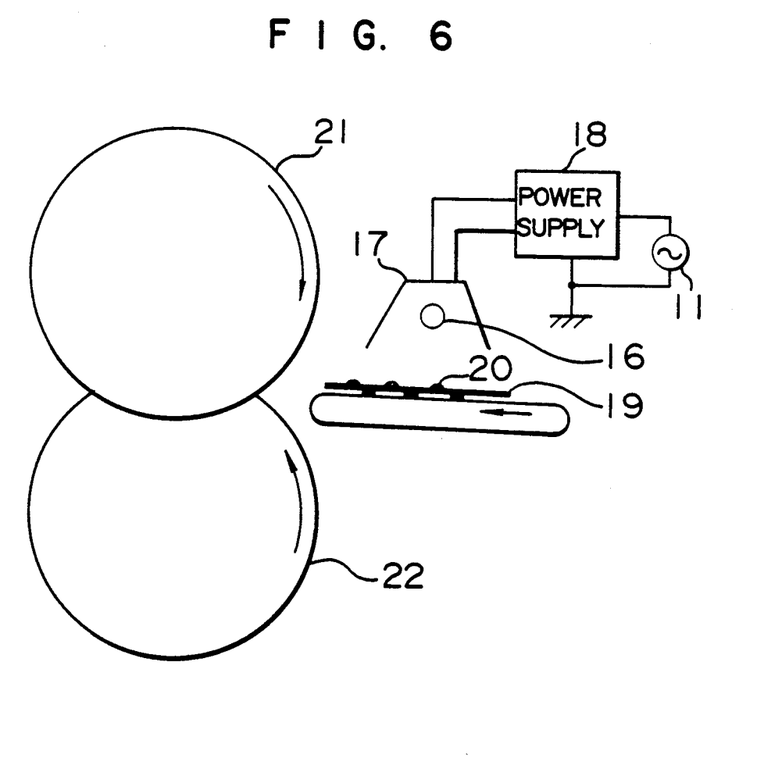
FIG. 6 is a diagram illustrating an embodiment of a non-contact pre-heating apparatus improved so as to use the electrical power supply according to the present invention.
Figure 11:
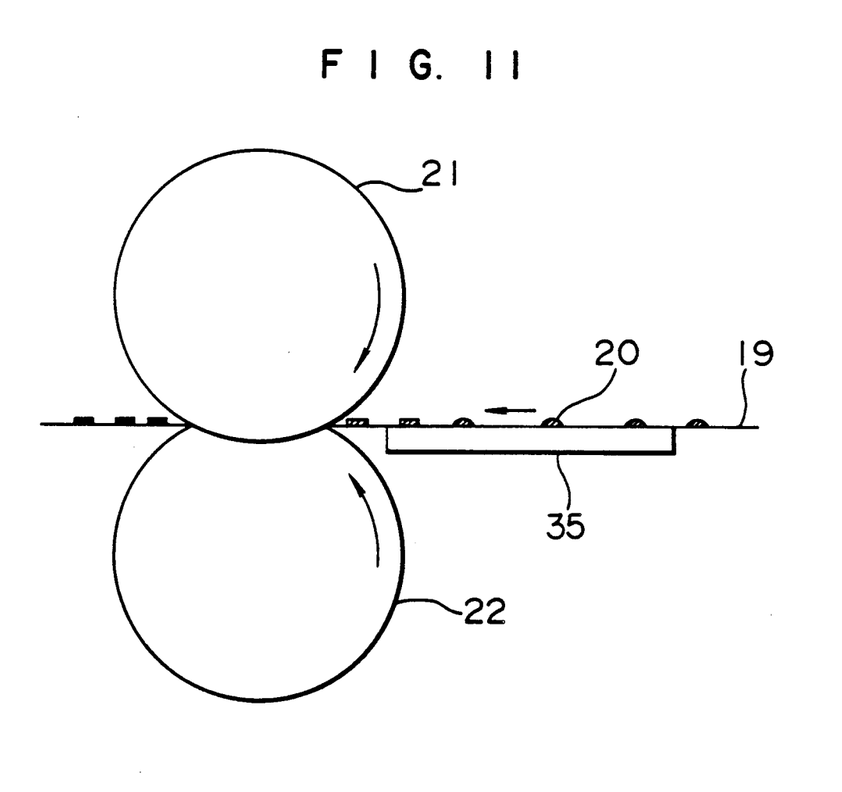
FIG. 11 is a sectional side view illustrating a conventional pre-heating apparatus.

FIG. 6 shows an application of this electrical power supply, as a non-contact pre-heating apparatus, to an electrophotographic heat roll fusing apparatus. First, for the better understanding of this invention, a conventional pre-heating apparatus will be described with reference to FIG. 11. In FIG. 11, a heat roll 21 is made of metal and has a releasing layer of Teflon or the like on its surface, and the surface of the heat roll 21 is heated to a temperature within a range of from 160° C. to 200° C. A backup roll 22 is made of resilient material such as silicone rubber or the like, and disposed so as to contact with the heat roll 21 to make a pair therewith for fusing toner 20 on a recording paper 19 when the recording paper 19 carrying the toner 20 is put between the heat roll 21 and the backup roll 22. In the case of high speed printing, sufficient fusing cannot be performed by only the heat roll 21, so a so pre-heating plate 35 is provided. The surface temperature of the pre-heating plate 35 is made to be within a range of from 80° C. to 120° C. The pre-heating plate 35 is disposed just before the heat roll 21 so as to perform heating and fusing the recording paper 19 from the back thereof. Recently, however, double-side printing has begun to be performed by use of cut sheet paper. The double-side printing means printing in which the transfer and fusing process is carried out upon each of the front and back surfaces of one and the same sheet of paper in a recording apparatus. That is, printing is performed in the order of the transfer and fusing operation on a first side, and next, after reversing the recording paper, the transfer and fusing operation is performed on a second side of the same recording paper. In the case of high speed printing, sufficient fusing cannot be performed by only the heat roll 21. If the conventional pre-heating plate 35 is used, however, the toner which has been fixed on the back side of the recording paper 19 may be fused, and it is therefore impossible to use the pre-heating plate 35. Although pre-heating by use of a xenon flash lamp is considered as the most hopeful method to solve the above problem, this method has not been put into practical use yet because there is a problem that an electrical power supply for the lamp is large in size as well as in power consumption.

FIG. 6 is a sectional side view of the flash pre-heating apparatus according to the present invention which can solve the above problem. Just before the heat roll 21, the toner 20 carried on the recording paper 19 is pre-heated by a xenon flash lamp 16 with the aid of a reflecting plate 17 without contact. The xenon flash lamp 16 and the light emitting power supply 18 therefor in this apparatus are the same as those provided in the circuit shown in FIG. 5. There are provided no limiting resistor and no charging capacitor in the power supply 18, and the power supply is small in volume, in weight and in power consumption. In this embodiment, even in the case of double-side printing, it is possible to prevent distortion from occurring in a printed image caused by re-fusing of the back-side toner since non-contact pre-heating is performed by use of a flash lamp, and in a recording paper transporting apparatus, there is no possibility that a recording side is soiled by refused toner. Further, there is an effect that the electrical power supply 18 can be made small in its volume as well as weight and can be made low in its power consumption.

Figure 7:
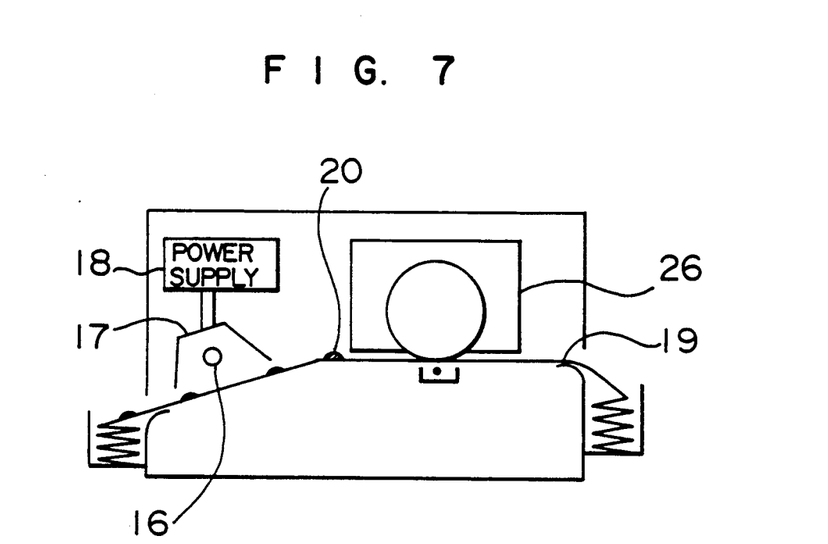
FIG. 7 is a diagram illustrating a printer using the electrical power supply according to the present invention.

FIG. 7 is a sectional side view of an electrophotographic printer using the flash fusing apparatus shown in FIG. 5. In a printing station 26, toner 20 carried on recording paper 19 as a toner image corresponding to an electrostatic latent image is fixed by the flash lamp 16 with the aid of a reflecting plate 17. There are provided no limiting resistor and no charging capacitor in the electrical power supply 18. Therefore, the printer according to this embodiment is small in its volume and weight and low in its power consumption. Although a printer is illustrated in this embodiment, the same effect can be obtained in any recording apparatus, such as a facsimile, a copying machine, etc., so long as the apparatus uses an electrophotographic process.

Figure 8:
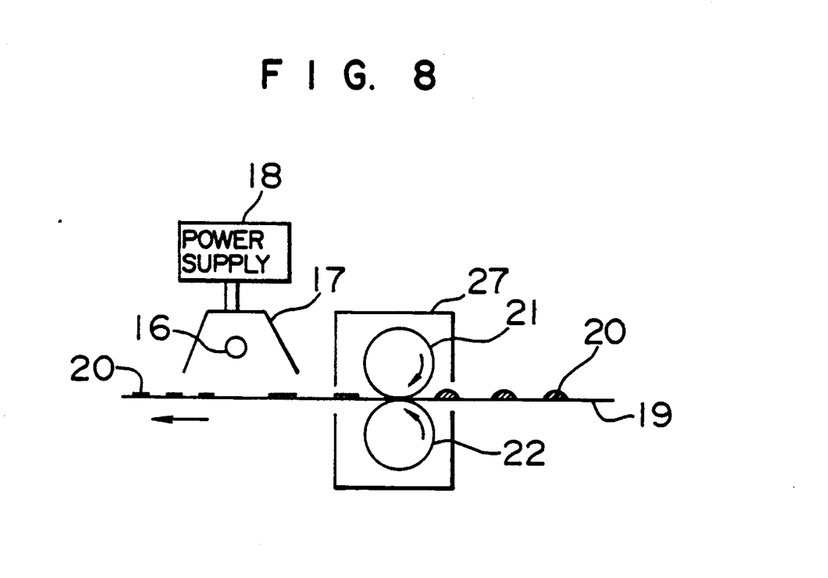
FIG. 8 is a diagram illustrating a flash fusing apparatus and a pre-heating apparatus using the electrical power supply according to the present invention.

FIG. 8 is a sectional side view of another embodiment of the flash fusing apparatus and pre-heating apparatus according to the present invention. The configuration of the flash fusing apparatus is the same as that shown in the embodiment in FIG. 5 in that it is constituted by a flash lamp 16, a reflecting plate 17 and an electrical power supply 18. In this embodiment, however, the required power of the flash fusing apparatus is smaller than that in the embodiment in FIG. 5 because the toner 20 carried on recording paper reaches the flash fusing apparatus in a semifused state made by means of a heat roll pre-heating apparatus 27. According to this embodiment, therefore, the power consumption of the electrical power supply 18 is smaller and the electrostatic capacity of its capacitors is also smaller, and there is an effect that the apparatus can be made smaller in volume as well as in weight.

Figure 9:
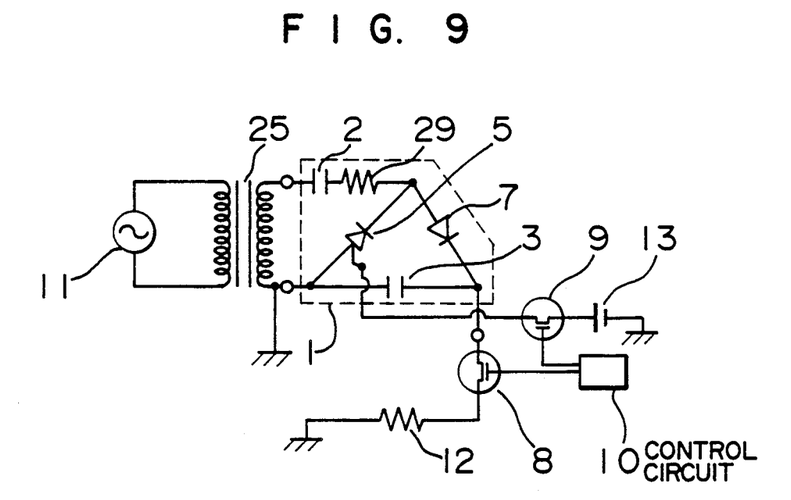
FIG. 9 is a diagram illustrating a third embodiment of the electrical power supply according to the present invention.

FIG. 9 is a circuit diagram illustrating a third embodiment of the electrical power supply according to the present invention. Although this embodiment is constituted by a two-stage Cockcroft-Walton circuit 1, the control timing of a control circuit 10 is the same as that in the embodiment in FIG. 1. Since a thyristor 5 is disposed on the ground side of the first stage of the Cockcroft-Walton circuit 1, no photo-coupler is necessary. Although a current at the time of discharging flows in a diode 7, a protector resistor 29 protects the diode 7, and there is no possibility that the diode 7 is damaged. According to this embodiment, there is an effect that it is possible to eliminate a photo-coupler in the control signal circuit for the thyristor 5.

This embodiment has shown the case where a primary-side low-voltage AC supply is insulated and boosted by an insulating transformer and the ground is provided on the secondary side. In the case where the ground cannot be provided because of use of an autotransformer or the like, this embodiment can be applied if a photo-coupler is provided in the control signal circuit. The autotransformer has a problem that it cannot be grounded independently, while it has an advantage in that it is small in its weight and volume and is inexpensive. Accordingly, this embodiment is preferable to be used in the case where the problem in the autotransformer is to be solved and the apparatus is to be reduced in weight, in volume as well as in cost.

According to the present invention, since it is possible to eliminate a limiting resistor and a charging capacitor in an electrical power supply, there is an effect that the electrical power supply can be reduced in volume, in weight and in power loss.

What is claimed is:

1. An electrical power supply for supplying momentarily a DC high voltage to a load, comprising:
   a DC high voltage circuit including a plurality of stages, each stage including a capacitor and a rectifier element, and connected to receive an AC low voltage at a first stage and to electrically charge the capacitor of a last stage to a DC high voltage, at least one of the rectifier elements of the stages being a rectifying control element;
   a switching element connected between the capacitor of the last stage and a load; and
   control means selectively operating in one of:
   a first mode wherein the at least one rectifier element is rendered conductive while the switching element is rendered non-conductive, thereby allowing the capacitors of the stages to be electrically charged through the associated rectifier elements of the stages so that the capacitor of the last stage is electrically charged to the DC high voltage; and
   a second mode wherein the at least one rectifier element is rendered non-conductive and then the switching element is rendered conductive, thereby allowing the electric charge of the capacitor of the last stage to be discharged momentarily into the load.

2. An electrical power supply according to claim 1, wherein the at least one rectifier element is one of a thyristor and a transistor.

3. An electrical power supply according to claim 2, wherein the DC high voltage circuit is a Cockcroft-Walton circuit.

4. An electrical power supply according to claim 3, wherein the rectifier elements of odd-numbered stages of said Cockcroft-Walton circuit are constituted by one of thyristors and transistors.

5. An electrical power supply according to claim 3, wherein the at least one rectifier element is in an isolated state in the second mode.

6. An electrical power supply according to claim 5, wherein the at least one rectifier element is changed from a conductive state to the isolated state when substantially no current is flowing in the at least one rectifier element.

7. An electrical power supply according to claim 5, wherein the rectifier element of one of the stages of said Cockcroft-Walton circuit is connected to ground, and is one of a thyristor and a transistor.

8. An electrical power supply according to claim 7, wherein the rectifier element of the first stage of said Cockcroft-Walton circuit is connected to ground, and wherein the Cockcroft-Walton circuit has two stages for doubling a peak voltage of the AC low voltage.

9. An electrophotographic fusing apparatus comprising:
   an electrical power supply; and
   a xenon flash lamp driven by said electrical power supply;
   wherein fusing is performed by using said xenon flash lamp as a flash light emitting device; and
   wherein the electrical power supply comprises:
   a Cockcroft-Walton circuit including a plurality of stages, each stage including a capacitor and a rectifier element, and connected to receive an AC low voltage at a first stage and to electrically charge the capacitor of a last stage to a DC high voltage, at least one of the rectifier elements of the stages being one of a thyristor and a transistor;
   a switching element connected between the capacitor of the last stage and the lamp; and
   control means selectively operating in one of:
   a first mode wherein the at least one rectifier element is rendered conductive while the switching element is rendered non-conductive, thereby allowing the capacitors of the stages to be electrically charged through the associated rectifier elements of the stages so that the capacitor of the last stage is electrically charged to the DC high voltage; and
   a second mode wherein the at least one rectifier element is rendered non-conductive and then the switching element is rendered conductive, thereby allowing the electric charge of the capacitor of the last stage to be discharged momentarily into the lamp.

10. An electrophotographic fusing apparatus comprising:
    a heat roll fusing apparatus; and
    a pre-heating apparatus including a non-contact heating source, the non-contact heating source including an electrical power supply and a xenon flash lamp driven by the electrical power supply;
    wherein the electrical power supply comprises:
    a Cockcroft-Walton circuit including a plurality of stages, each stage including a capacitor and a rectifier element, and connected to receive an AC low voltage at a first stage and to electrically charge the capacitor of a last stage to a DC high voltage, at least one of the rectifier elements of the stages being one of a thyristor and a transistor;
    a switching element connected between the capacitor of the last stage and the lamp; and
    control means selectively operating in one of:
    a first mode wherein the at least one rectifier element is rendered conductive while the switching element is rendered non-conductive, thereby allowing the capacitors of the stages to be electrically charged through the associated rectifier elements of the stages so that the capacitor of the last stage is electrically charged to the DC high voltage; and a second mode wherein the at least one rectifier element is rendered non-conductive and then the switching element is rendered conductive, thereby allowing the electric charge of the capacitor of the last stage to be discharged momentarily into the lamp.

11. A recording apparatus for recording an image by depositing toner on a recording medium, comprising:
 a fusing apparatus for fusing the toner deposited on the recording medium, wherein the fusing apparatus comprises:
 an electrical power supply; and
 a xenon flash lamp driven by said electrical power supply;
 wherein fusing of the toner is performed by using said xenon flash lamp as a flash light emitting device; and
 wherein the electrical power supply comprises:
 a Cockcroft-Walton circuit including a plurality of stages, each stage including a capacitor and a rectifier element, and connected to receive an AC low voltage at a first stage and to electrically charge the capacitor of a last stage to a DC high voltage, at least one of the rectifier elements of the stages being one of a thyristor and a transistor;
 a switching element connected between the capacitor of the last stage and the lamp; and
 control means selectively operating in one of:
 a first mode wherein the at least one rectifier element is rendered conductive while the switching element is rendered non-conductive, thereby allowing the capacitors of the stages to be electrically charged through the associated rectifier elements of the stages so that the capacitor of the last stage is electrically charged to the DC high voltage; and
 a second mode wherein the at least one rectifier element is rendered non-conductive and then the switching element is rendered conductive, thereby allowing the electric charge of the capacitor of the last stage to be discharged momentarily into the lamp.

* * * * *